United States Patent [19]
McGrath

[11] Patent Number: 5,190,569
[45] Date of Patent: Mar. 2, 1993

[54] PURIFICATION APPARATUS FOR PNEUMATIC SYSTEMS

[76] Inventor: Wayne D. McGrath, 4943 Park Rd., #703, Charlotte, N.C. 28209

[21] Appl. No.: 714,668

[22] Filed: Jun. 13, 1991

[51] Int. Cl.$^5$ .............................................. B01D 46/00
[52] U.S. Cl. ...................................... 55/218; 55/269; 55/316; 55/323; 55/337; 55/482; 55/498; 55/528
[58] Field of Search ........................ 55/218, 267-269, 55/316, 322, 323, 327, 337, 387, 482, 498, 528

[56] References Cited
U.S. PATENT DOCUMENTS
4,029,486 6/1977 Frantz ................................... 55/218

FOREIGN PATENT DOCUMENTS
0036569 9/1981 European Pat. Off. .............. 55/387

Primary Examiner—Bernard Nozick
Attorney, Agent, or Firm—Shefte, Pinckney & Sawyer

[57] ABSTRACT

An air purification apparatus for pneumatic systems utilizing a water trap, a precooler, and a three-stage purification apparatus having filtration means, an air cooling chamber for moisture condensation, and a plurality of moisture traps, all in a compact, efficient package. The purification apparatus automatically purges collected moisture in response to the compressor duty cycle.

17 Claims, 6 Drawing Sheets

PURIFICATION APPARATUS FOR PNEUMATIC SYSTEMS

BACKGROUND OF THE INVENTION

The present invention relates broadly to pneumatic systems such as air brake systems for use on trucks and the like, and, more particularly, to an air purification device for use within such pneumatic systems.

Virtually all large trucks, whether dump trucks, over-the-road tractors, garbage trucks, or the like utilize pneumatic systems for brake and/or clutch operation. Ideally, the air within the pneumatic systems should be free of moisture acquired from the atmosphere and should contain only traces of oil which acts as a lubricant for valves, calipers and other operative devices within the system. Such pneumatic systems typically consist of a compressor which receives air from the atmosphere and through action akin to a positive displacement pump, then supplies air at an elevated pressure to the pneumatic system. Downstream from the compressor, a supply reservoir stores the pressurized air for use within the operative components of the system, the system being a closed loop, thus maintaining air within the operative components at a constant elevated pressure.

The compressor must draw air from the atmosphere which is typically filtered using a simple paper mesh design which can quickly become contaminated and ultimately pass airborne moisture and other solid contaminants through to the compressor and ultimately into the pneumatic system itself. The problem is particularly acute in areas of elevated temperature and humidity. Additionally, the problem is exacerbated when the pneumatic system is used on a slow moving vehicle having a particularly active compressor duty cycle, such as a garbage truck, an earth mover or other such slow moving vehicle prone to frequent brake use.

Currently, filtration systems are inadequate to remove sufficient moisture from the air entering compressor and ultimately the pneumatic system to prevent component damage over extended use. Typically, especially in areas of high humidity and temperature, moisture will infiltrate the pneumatic system, leaving deposits on sensitive components such as brake calipers and safety valves. The latter problem is of particular concern because without sufficient emergency pressure relief, pressure could rise within the pneumatic system to unsafe levels and ultimately cause failure of a component or the entire system, and could therefor place the operator of the vehicle in danger. Consequently, it has become highly desirable to remove as much moisture as possible from the air entering the pneumatic system. As previously stated, conventional filtration methods are not up to the task.

SUMMARY OF THE INVENTION

It is accordingly an object of the present invention to provide an apparatus for reduction of moisture within pneumatic systems which overcomes or alleviates the aforementioned problems. Specifically, it is an object of the present invention to provide an apparatus for reduction of moisture with pneumatic systems which removes moisture from air prior to entry into the compressor as well as air exiting the compressor prior to entry into the supply reservoir.

Briefly summarized, the present invention includes a water trap, a precooler and an air dryer. The air dryer includes a casing having at least one air inlet, an air flow path therethrough, at least one air outlet, and at least one drainage outlet. The air dryer provides three stage moisture removal within the casing including a first stage for filtration of incoming air including a first stage filtration chamber located within the casing adjacent the air inlet within the flow path and a filtration chamber in communication with the air inlet and containing a metallic mesh filter for filtering out solid particulate matter which may be entrained within the airstream entering the casing. The filtration chamber includes an airstream outlet.

Also included within the casing is a second stage for cooling the airstream including an inlet for receiving the airstream from the first stage outlet and a chamber arrangement for cooling the airstream to a sufficient degree to induce condensation and agglomeration of moisture contained in the airstream. The casing includes a generally cylindrical exterior wall portion which is formed of a material having a large thermal conductivity and a generally cylindrical inner wall portion spaced away from and located concentrically with the exterior wall portion to form an annular chamber therebetween. A helical guide wall extends between the inner wall portion and the exterior wall portion to form a helical flow path within the annular chamber through which the airstream flows helically through the cooling chamber, in contact with the exterior wall portion and interior wall portion allowing the exterior wall portion and the interior wall portion to conduct heat away from the airstream, thereby cooling the airstream sufficiently to induce condensation and agglomeration of moisture within the air therein.

The casing of the air dryer also includes a third stage for removing moisture from the airstream, including an inlet receiving the airstream from the second stage outlet, a moisture reduction chamber including a moisture reduction arrangement for acquiring moisture from the airstream passing therethrough. The moisture reduction arrangement includes a plurality of moisture traps arranged sequentially in the airstream flow path, causing a pressure drop in the airstream as it passes through each moisture trap in the sequence. Each moisture trap removes a quantity of moisture which has condensed and agglomerated in the second cooling stage and each is formed of a material more dense than the material of which the preceding moisture trap is formed, thereby allowing removal of increasingly minute droplets of moisture.

The moisture traps include a first pair and a second pair of concentric annular tubes located in the air flow path within the moisture reduction chamber. The tubes are formed of a porous molded polyethylene structure of variable bulk density. Preferably, the innermost tube in the first pair retains particles of approximately 250 microns, the outermost tube in the first pair retains particles of approximately 125 microns, the outermost tube in the second pair retains particles of approximately 60 microns and the innermost tube in the second pair retains particles of approximately 10 microns. The second pair of tubes is coaxial and cylindrically coplanar with the first pair of tubes, both pair of tubes being separated by a tube support member wherein the airstream flows radially outwardly through the first pair of tubes and radially inwardly through the second pair of tubes then outwardly through the air outlet. A collection chamber within the moisture reduction chamber collects the moisture acquired by the moisture reduction arrangement. A channel communicating with the casing air outlet permits the airstream to be returned to the pneumatic system through the casing outlet.

Also included within the casing is a moisture evacuation arrangement for evacuation of the collected moisture from the air dryer whereby the air dryer can receive impurities and moisture from the pneumatic system when the compressor is operating thereby generating an airstream within the air dryer and wherein the evacuation arrangement expels collected moisture from the air dryer when the compressor ceases operation.

According to the preferred embodiment of the present invention, the moisture evacuation arrangement includes a check valve assembly for selectively venting the contents of the collection chamber into the moisture evacuation arrangement. Preferably, the collection chamber includes a bottom wall portion, and the moisture evacuation arrangement includes a holding reservoir located beneath the bottom wall portion, the collection chamber being on the downstream side of at least one of the moisture traps and the holding reservoir being on the upstream side of the moisture trap. The bottom wall portion has at least one passageway formed therein, the check valve assembly being located in the passageway and being held in a closed position by the pressure differential across the check valve created by the pressure drop across the moisture trap. Also included within the moisture evacuation assembly is a selectively operable moisture evacuation valve for venting the holding reservoir to the atmosphere, thereby expelling the collected moisture from the air dryer.

According to the preferred embodiment of the present invention, the purification apparatus further comprises a precooler for use in areas of elevated humidity, the precooler being located upstream of the air dryer and including a frame and a helical coil supported by the frame. The helical coil is formed of a material having a large thermal conductivity and has a plurality of turns disposed in a spaced side-by-side relationship creating space between each turn whereby atmospheric air can flow through the spaces and remove heat from the coil and from the airstream in the coil. This induces condensation and agglomeration of moisture within the airstream prior to the airstream entering the air dryer.

It is further preferred that the purification apparatus include a water trap located upstream of the air dryer for use in areas of elevated humidity and includes a heat source arrangement. The water trap is a perforated container having a desiccant therein for removal of moisture from the airstream. The water trap is preferably mounted closely adjacent a heat source thereby allowing heated air to pass through the perforations to warm the desiccant, evaporating moisture trapped therein, and renewing the desiccant.

DESCRIPTION OF THE PREFERRED EMBODIMENT

Figure 1:
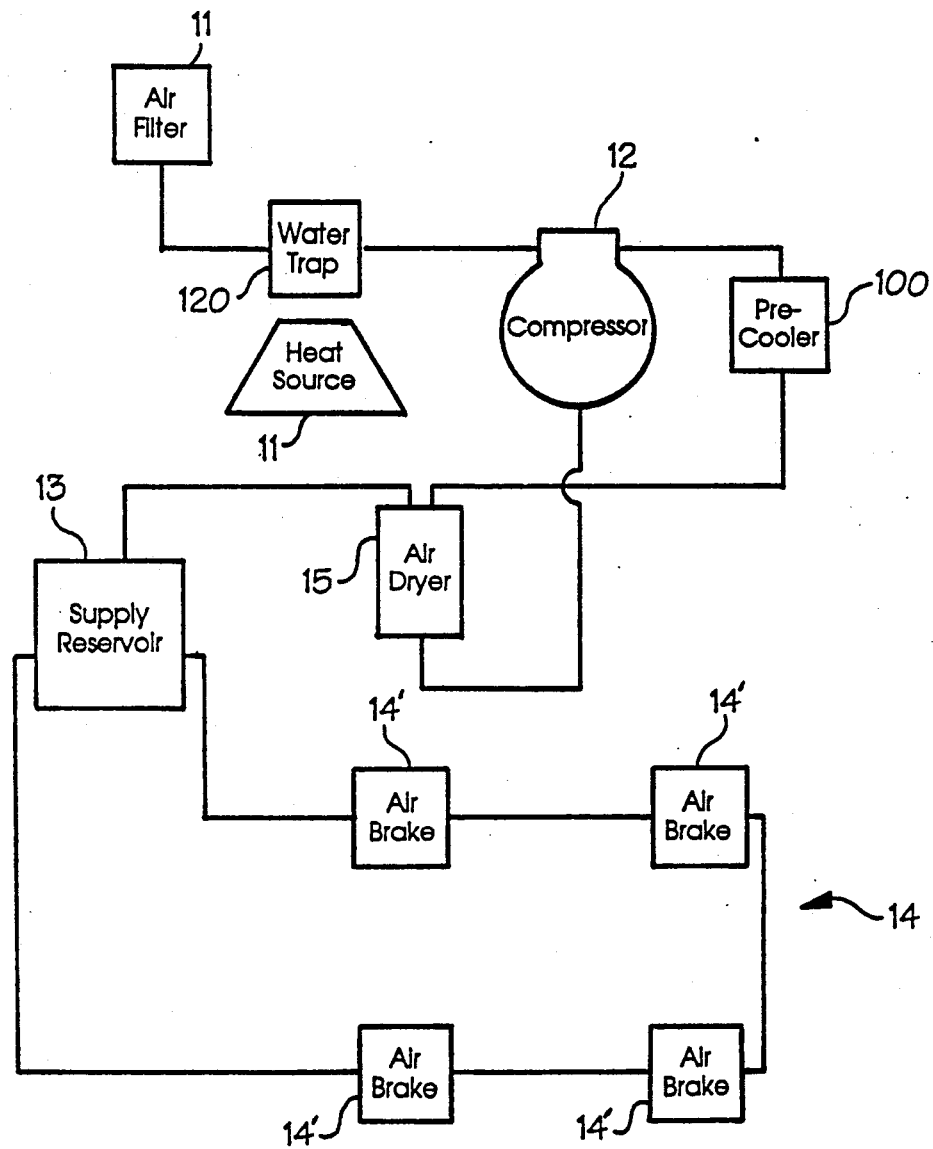
FIG. 1 is a schematic representation of a vehicle brake system that includes the purification apparatus according to the preferred embodiment of the present invention.

Looking now in greater detail at the accompanying drawings, and particularly at FIG. 1, a pneumatic system is shown which includes the purification apparatus according to the preferred embodiment of the present invention. The purification apparatus includes a water trap 120, a precooler 100 and an air dryer 15. As seen in FIG. 1, the purification apparatus is integrated with a typical pneumatic system, including a conventional air filter 11, a compressor 12, and a supply reservoir 13. The supply reservoir 13 provides a constant source of pressurized air for a pneumatic control system, shown in FIG. 1 as an air brake system 14 having four air brakes 14'. A heat source 11', which is preferably the engine of the vehicle in which the pneumatic system is used, is necessary for proper water trap 120 operation, and the water trap 120 should be located in close proximity thereto. This process will be more fully explained hereinafter.

Figure 2:
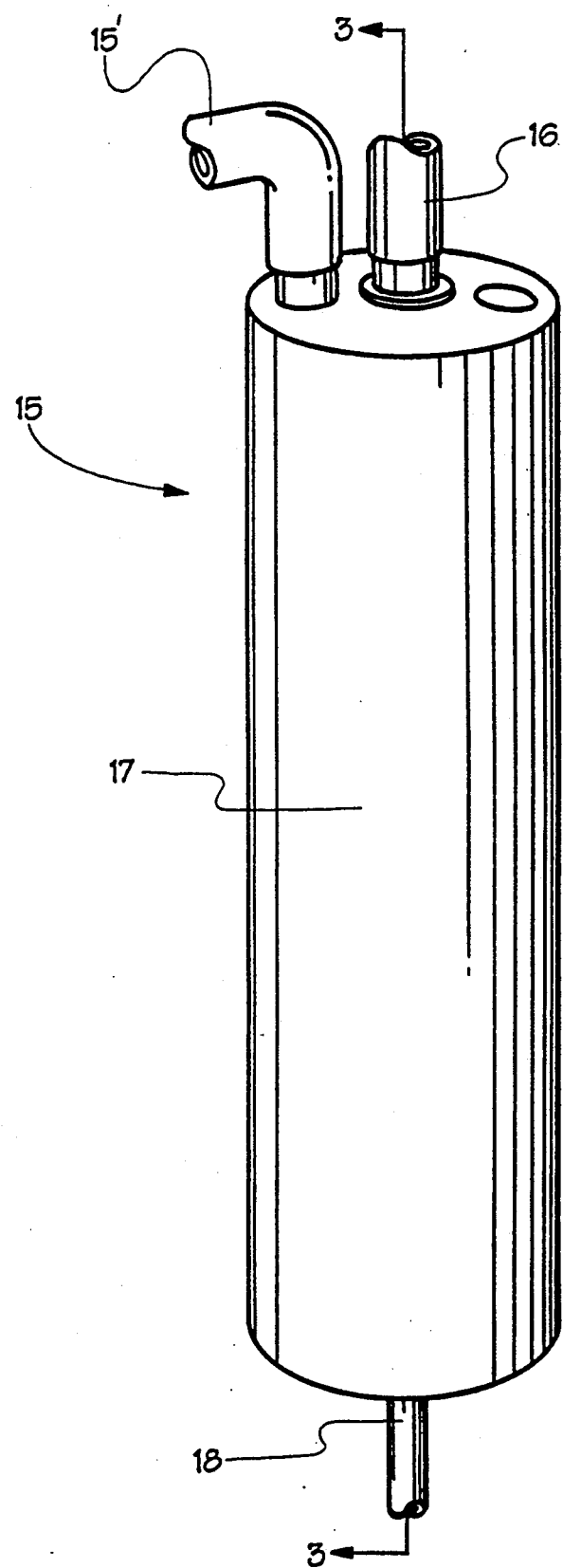
FIG. 2 is a perspective view of the air dryer used in the purification apparatus of the present invention.
Figure 3:
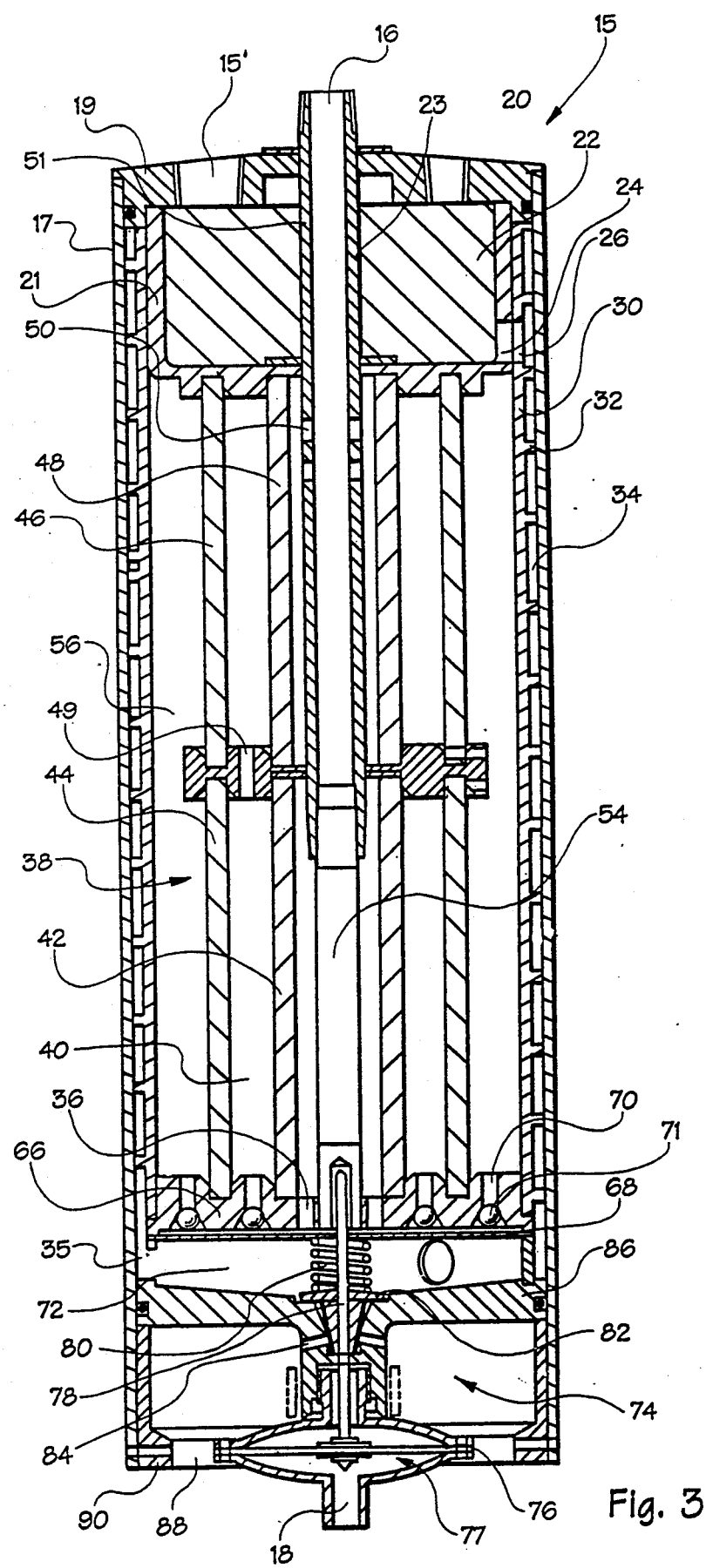
FIG. 3 is a side sectional view of the air dryer of FIG. 2 taken along line 3—3 thereof.
Figure 4:
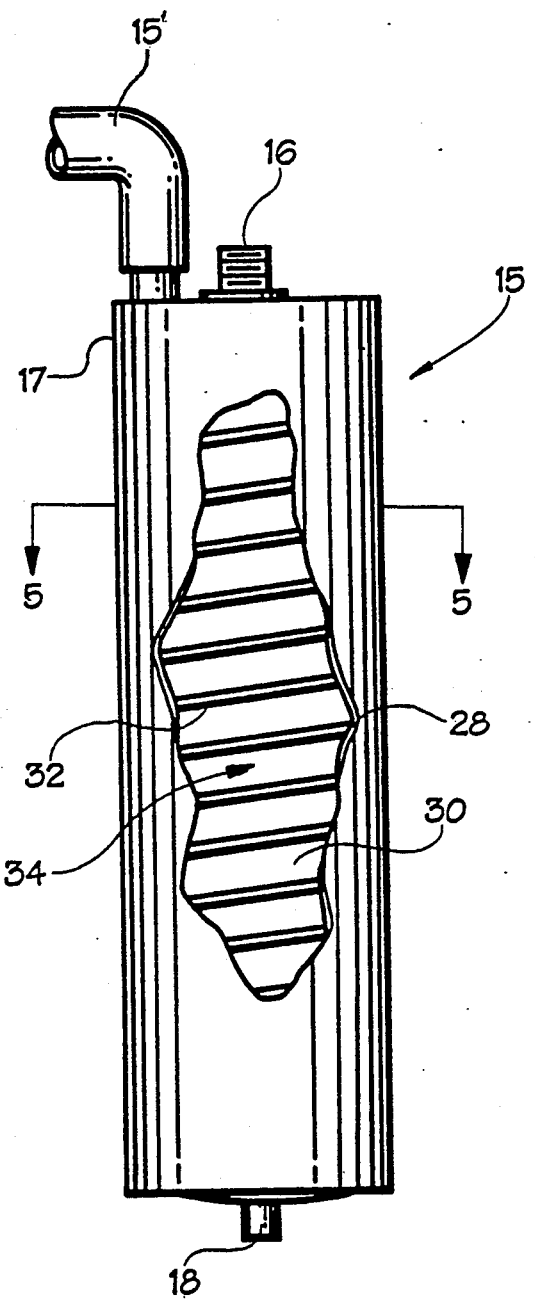
FIG. 4 is a side view of the air dryer illustrated in FIG. 2 and broken open to illustrate the helical cooling chamber of the present invention.

As best seen in FIGS. 2 and 3, the air dryer 15 includes a generally cylindrical outer casing 17 which is sealed and capped at both ends using an upper end cap 19 and a lower end cap 90. An airstream inlet 15' extends through the upper end cap 19 of the casing 17 and communicates with the outlet of the compressor 12 and the precooler 100 (see FIG. 1). An airstream outlet 16 projects outwardly from the upper end cap 19 of the casing 17, and communicates with the supply reservoir 13 (see FIG. 1). A compressor exhaust inlet 18 projects outwardly from the lower end of the compressor 12 (see FIG. 1). As will be explained in greater detail below, the compressor exhaust is utilized to evacuate collected moisture from the air dryer 15.

As best seen in FIG. 3, the air dryer 15 of the present invention provides three-stage air drying and filtering within the cylindrical casing 17, namely a first filtration stage for removing airborne particulate matter from the airstream, a second cooling stage for cooling the airstream whereby moisture thereby will condense and agglomerate, and a third moisture removal stage for removing the condensed and agglomerated moisture from the airstream. As will be explained in greater detail below, the structural characteristics of the three stages are formed to direct the airstream in a predetermined flow path through each consecutive stage of purification.

The first filtration stage, the operation of which will be explained presently, includes a filtration chamber 20 formed from a cup-shaped chamber wall member 21 which abuts the upper end cap 19 of the casing 17 and projects inwardly into the casing 17. As will be explained in more detail presently, an airstream outlet conduit 51, which is coaxial with the central axis of the cylindrical air dryer 15, extends axially through the center of the filtration chamber 20 forming a cylindrical inner wall 23 of the annular, cylindrical filtration chamber 20. The filtration chamber 20 is in communication with the airstream inlet 15' and contains a conventional metallic mesh filter 22 for acquisition of particles of foreign matter entrained in the airstream. The metallic mesh filter 22 may be formed of steel or any other suitable filter media. The chamber wall member 21 has a passageway 24 formed in a lower portion thereof and spaced substantially away from the airstream inlet 15', and the passageway 24 communicates with the second cooling stage, thus providing a predetermined airstream flow path from the airstream inlet 15' through the mesh filter 22 and outwardly through the passageway 24 to the second cooling stage.

The second cooling stage includes an annular cooling chamber 34, formed by the casing 17 and an inner wall portion 30 located closely adjacent and concentric with the casing 17. The casing 17 is preferably formed of copper, but may be formed of other materials capable of effective heat transfer. A helical guide wall 32 is positioned to extend perpendicularly between the outer wall portion 28 and the inner wall portion 30, and spirals downwardly from a cooling chamber inlet 26 formed in the inner wall portion 30 and along the axial length of the cylindrical casing 17 to a cooling chamber outlet 35 formed in the inner wall portion 30 adjacent a holding reservoir 72. The holding reservoir 72, which will be explained in more detail presently, acts as a passageway from the cooling chamber outlet 35 to a moisture removal chamber inlet 36, directing the airstream inwardly toward the central axis of the air dryer 15, where the airstream enters the moisture removal chamber inlet 36, thereby entering the third moisture removal stage.

At the moisture removal chamber inlet 36, the airstream undergoes a change of direction within and following the predetermined flow path and is directed upwardly into a moisture removal chamber 38. It should be noted that by providing concentric, annular chambers for cooling and moisture removal, and by directing the predetermined flow path downwardly through the cooling chamber 34 and then directing the airstream generally upwardly through the moisture removal chamber 38, the air dryer 15 of the present invention can be constructed as a more compact unit. Also, by locating the cooling chamber 34 adjacent the casing 17, heat transfer from the airstream to the cooler ambient air through the casing 17 is enhanced.

The third moisture removal stage includes the moisture removal chamber 38, a moisture collection chamber 40, a series of tubular moisture traps 42,44,46,48, and a moisture trap support member 49. The moisture removal chamber 38 is of a generally cylindrical configuration and occupies the central portion of the air dryer 15 within the casing 17 between a central support member 54 and the air outlet channel conduit 51 and the inner wall portion 30 of the cooling chamber 34. The moisture removal chamber 38 is spaced a distance away from both the upper end cap 19 and the lower end cap 90 of the casing 17 by the filtration chamber 20 and a moisture evacuation valve 74, respectively. The moisture evacuation valve 74 will be more fully explained hereinafter.

The moisture collection chamber 40 is located in the lowermost area of the moisture removal chamber 38 for collecting moisture which has been acquired by the moisture traps 42, 44, 46, 48, and it includes a bottom wall portion 66, which extends radially outwardly from the central support member 54 to the inner wall portion 30 of the cooling chamber 34. The moisture trap support member 49 is located at the center of the moisture removal chamber 38 where the central support member 54 is connected to the lower portion of the airstream outlet channel conduit 51. The moisture trap support member 49 extends radially outwardly from the airstream outlet channel conduit 51 to a position closely adjacent the inner wall portion 30 of the cooling chamber 34, leaving a passageway 56 within the predetermined flow path through which the airstream can pass.

Within the moisture removal chamber 38 a series of four moisture traps 42, 44, 46, 48 are positioned as stacked pairs of concentric annular tubes so that the airstream can be directed along a predetermined flow path that passes through the moisture traps 42,44,46,48 sequentially, as will be explained more fully presently. The moisture traps 42, 44, 46, 48 are preferably formed of a porous polyethylene material, but any suitable filter media may be utilized, with each such moisture trap being of an increased density than the previous moisture trap in the series so as to collect increasingly smaller droplets of moisture, as will be more fully explained hereinafter.

The first pair of moisture traps 42, 44 are mounted between the bottom wall portion 66 of the collection chamber 40 and the moisture trap support member 49, the first trap 42 being located adjacent the central support member 54, and closely adjacent the moisture removal chamber inlet 36. The second moisture trap 44 is located concentric with, and spaced radially outwardly from, the first moisture trap 42, forming a pair of concentric annular cylinders. The second pair of moisture traps 46, 48 are mounted between the moisture trap support member 49 and the lower surface of the filtration chamber wall portion 21 and arranged coaxially and cylindrically coplanar with the first pair of moisture traps 42, 44, and the two pairs of moisture traps are separated by the support member 49. The third moisture trap 46 is located adjacent the inner wall portion 30 of the cooling chamber 34 and is closely adjacent the passageway 56, and the fourth moisture trap 48 is located concentric with and is spaced a distance radially inwardly from the third moisture trap 46, thereby forming a pair of concentric annular cylinders. By virtue of this arrangement, the airstream flows along a predetermined flow path radially inwardly through the third moisture trap 46 and then radially inwardly through the fourth moisture trap 48 and into the airstream outlet conduit 51 through openings 50 therein.

Figure 5:
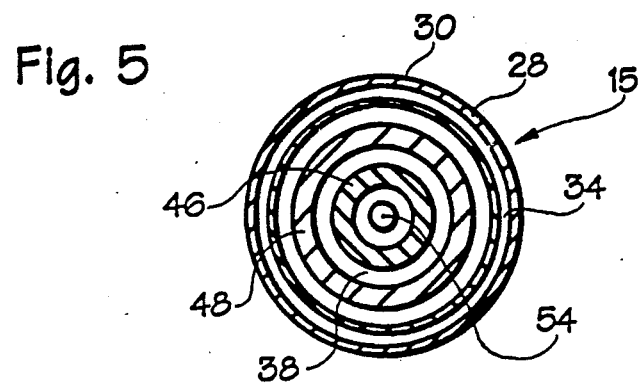
FIG. 5 is a top sectional view of the air dryer of FIG. 3 taken along line 5—5 in FIG. 4.

As best seen in FIG. 5, the cooling chamber 34, all four moisture traps 42, 44, 46, 48 and the central structural support member 54 are all in an annular, concentric, coaxial relationship within the cylindrical casing 17.

In order to release moisture collected by the moisture traps 42,44,46,48, a plurality of ball check valves 71, the operation of which will be more fully explained below, are located in passageways 70 in the lower wall portion 66 of the collection chamber 40, providing selective communication between the collection chamber 40 and the holding reservoir 72. The passageways 70 include inverted funnel shaped portions, each having a check valve 71 within the cone of the funnel so that when the condition exists wherein the airstream is at a greater pressure in the holding reservoir 72 than in the collection chamber 40, resulting in a pressure differential across the lower wall portion 66 and the check valves 71, the check valves 71 are urged into the narrow portion of the inverted funnel channel, thus closing the passageway 70. The check valves 71 are shown in FIG. 3 in a closed position. Conversely, when there is no such pressure drop, the check valves 71 move out of the narrow portion of the inverted funnel channel, said passageways 70 are opened to provide communication between the collection chamber 40 and the holding reservoir 72. A divider screen 68 is positioned directly adjacent the check valves 71 and the bottom wall portion 66, such divider screen 68 extending radially outwardly from the central support member 54 to the inner wall portion 30 of the cooling chamber 34. The divider screen 68 allows moisture to pass therethrough while retaining the check valves 71 in an operational position generally with the confines of the inverted funnel shaped portions of the passageways 70.

In order to expel from the air dryer 15 moisture collected during the airstream's passage through the third moisture removal stage, a moisture evacuation assembly is provided at the lower end of the casing 17, between the bottom wall portion 66 of the collection chamber 40 and the lower end cap 90, and this assembly includes a moisture evacuation valve 74, a moisture evacuation channel 84, and moisture evacuation outlets 88. More specifically, a moisture evacuation valve support member 86, the upper surface of which forms the lower wall portion of the holding reservoir 72, is generally T-shaped in cross-section, and extends radially the full extent of the area between the outer wall portion 28 of the cylindrical casing 17 and projects downwardly to the lower end cap 90 of the casing 17. A moisture evacuation channel 84 is formed in the moisture evacuation valve support member 86 and extends from the holding reservoir 72 through the downwardly projecting portion of support member 86 to provide, in conjunction with the moisture evacuation valve 74, selective communication between the holding reservoir 72 and the moisture evacuation outlets 88.

The moisture evacuation valve 74 is a diaphragm operated valve having a diaphragm 76 located in a diaphragm chamber 77 which is mounted on the support member 86. From the center of the diaphragm 76 a moisture evacuation valve control rod 78 projects upwardly along the central axis of the air dryer 15 through the evacuation valve support member 86, the holding reservoir 72, and terminates in a recess formed in the central support member 54. The control rod 78 has a moisture evacuation valve member 82 mounted thereon.

Between the moisture evacuation valve member 82 and the divider screen 68, a valve biasing spring 80 urges the moisture evacuation valve downwardly toward the closed position until an exhaust burst from the governor of the compressor provides pressure against the diaphragm 76 through the inlet 18 to move the diaphragm 71 and the evacuation valve member 82 upwardly to open the moisture evacuation valve 74. The above-described moisture evacuation outlets 88 provide a path for the collected moisture to be expelled from the air dryer 15 to the atmosphere when the moisture evacuation valve 74 is biased into an open position, whereby collected moisture can travel from the collection chamber 40, through the holding reservoir 72, the moisture evacuation channel 84, and through the moisture evacuation outlets 88 to the atmosphere.

Figure 6:
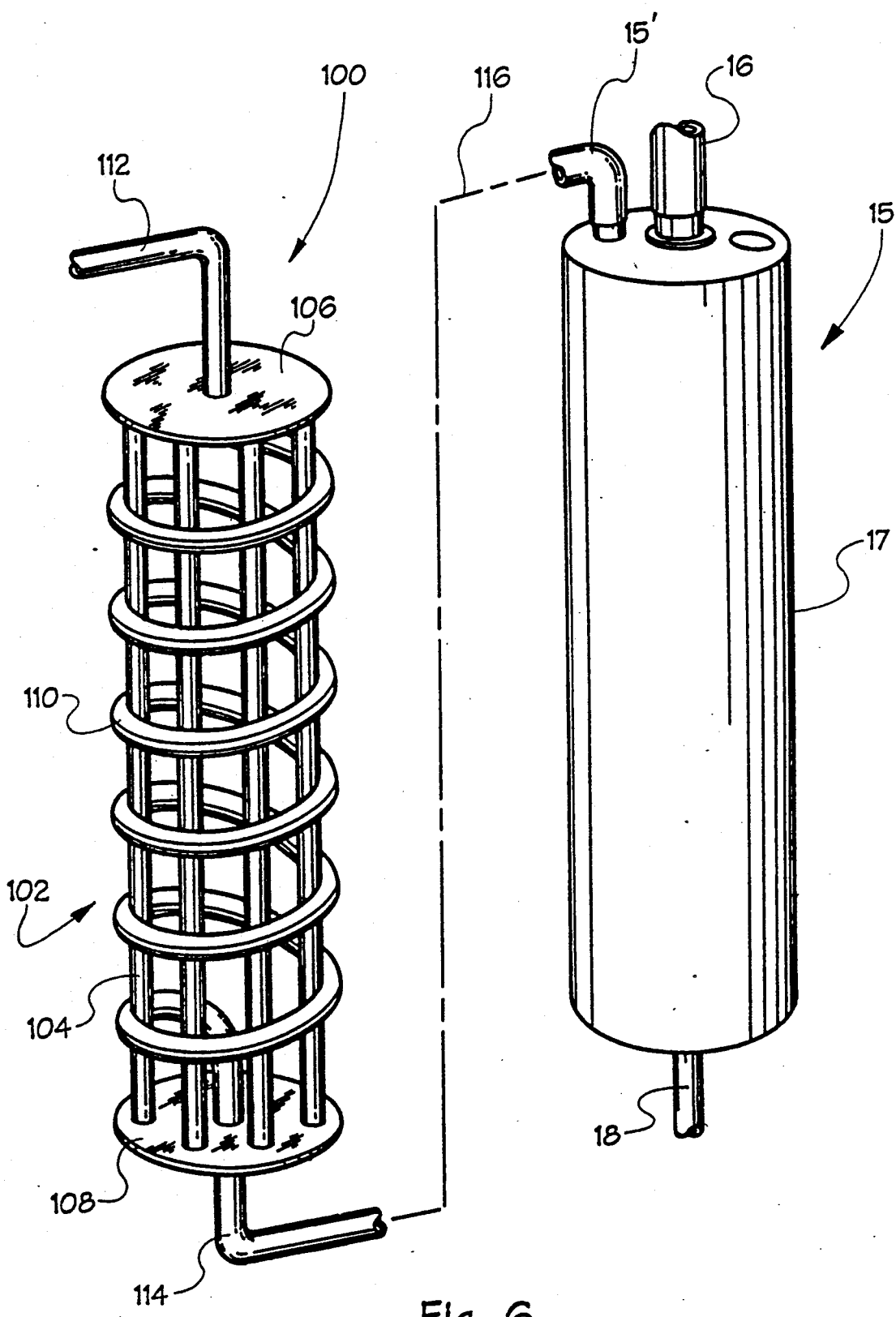
FIG. 6 is a perspective view of the present invention illustrating the precooler in combination with the air dryer illustrated in FIG. 1.

In addition to the air dryer 15, the present invention also includes a precooler 100, illustrated in FIG. 6, which has a frame 102 formed by two circular plates 106, 108 disposed in spaced parallel relationship to one another and joined by a series of rods 104. It will be noted that the frame rods 104 are arranged in a generally circular pattern and spaced away from one another in a generally parallel relationship, forming a cylindrical cage. An airstream inlet tube 112 provides a flow channel for the airstream coming from the compressor 12 (see FIG. 1) to the precooler 100 and it passes through the center of the upper plate 106 and then extends outwardly and then coils around the outermost portions of the frame rods 104 in an open helical path to form a coil 110 having a plurality of axially spaced turns that permits a free flow of atmospheric air therebetween, around the turns of the coil 110 and through the frame 102. The bottom of the coil 110 turns inwardly, and extends downwardly through the lower plate 108 to form an air outlet 114 of the precooler 100. An airstream transport conduit 116 provides pneumatic communication between the precooler 100 and the airstream inlet 15' of the air dryer 15.

Figure 7:
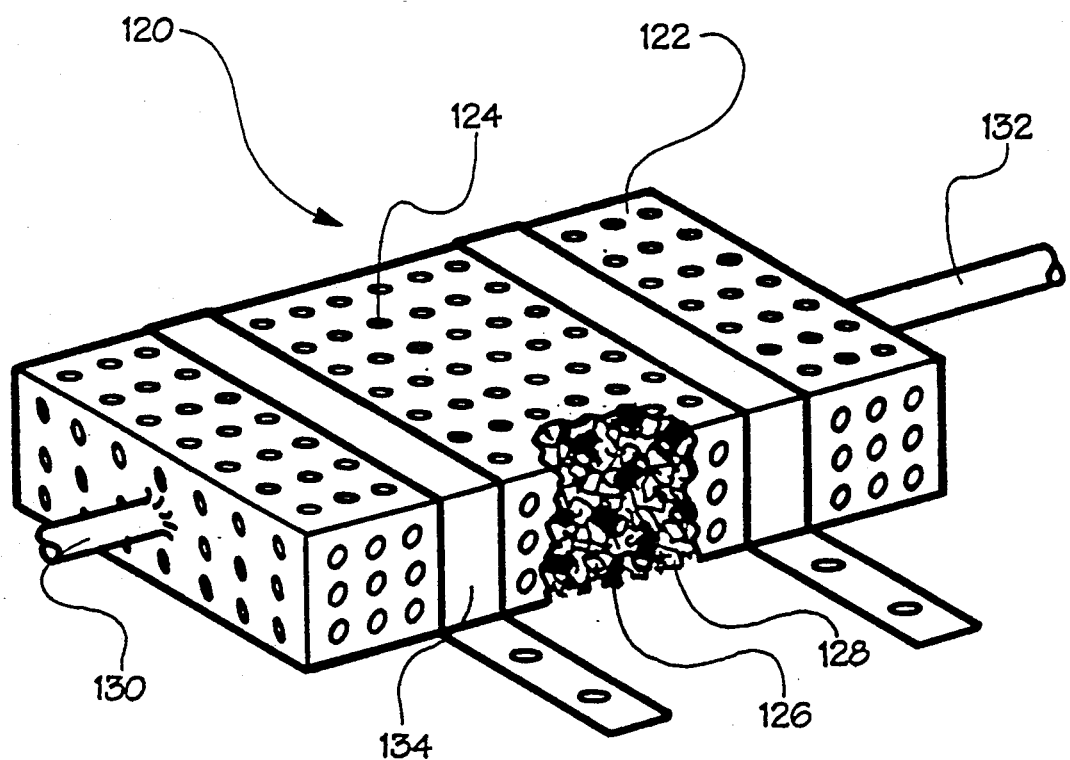
FIG. 7 is a perspective view of the water trap of the present invention.

In addition to the air dryer 15 and the precooler 100, the present invention offers further moisture removal in the form of a water trap 120, which, as best seen in FIG. 7, is formed as a generally rectangular box 122, having a series of apertures 124 formed in all of the walls thereof. The water trap 120 contains a mixture of desiccant pellets 126 and mesh cushion 128 preferably formed of a steel material, but which may be formed of any suitable cushioning material. An inlet conduit 130 extends into the box 122 providing pneumatic communication between the water trap 120 and a conventional air filter 11 (see FIG. 1) which accepts atmospheric air for input to the pneumatic system, and an outlet 132 projects outwardly from the box 122, providing pneumatic communication with the airstream inlet of the compressor 12 (see FIG. 1). Brackets 134, formed as straps, surround the water trap 120, providing easy mounting of the water trap 120 in an appropriate location.

Operation of the system is generally as follows. The purification apparatus of the present invention operates in conjunction with the duty cycle of the compressor 12, and when the compressor 12 is activated, atmospheric air enters the system through the air filter 11 (see FIG. 1) which may be paper, gauze or any suitable filter media, and this atmospheric air forms the airstream which traverses conduits on its way to the compressor 12 for pressurization and utilization by the pneumatic control system 14. The airstream first enters the purification apparatus at the water trap 120, flowing inwardly through the water trap inlet 130 where it is passed among the desiccant pellets 126 which remove a quantity of moisture from the airstream in a conventional manner. The water trap 120 should be mounted in a location close to the heat source 11', which will provide heated air that, due to natural circulation, passes through the apertures 124, thus causing the moisture contained within the desiccant pellets 126 to evaporate, thereby renewing the desiccant pellets 126. After preliminary moisture removal by the water trap 120, the airstream exits the water trap 120 through the airstream outlet 132 and proceeds into the compressor 12 (see FIG. 1) where, in the manner of a conventional compressor, the pressure of the air in the airstream is substantially increased.

From the compressor 12, the airstream is directed to the precooler 100, and it enters the precooler inlet 112 and travels through the cooling coil 110. Atmospheric air traverses the open frame 102 and the cooling coil 110, conducting heat away from the coil 110, and, as a result thereof, away from the airstream within the coil 110. This cooling of the airstream will cause some of the moisture therein to condense and agglomerate, and the cooled airstream then exits the precooler outlet 114.

From the precooler outlet 114, the conduit 116 directs the airstream into the airstream inlet 15' of the air dryer 15 where it flows along the predetermined flow path, through three stages of purification. Upon entering the casing 17 of the air dryer 15, the airstream immediately enters first filtration stage and the filtration chamber 20 where the airstream passes through the mesh filter 22, depositing thereon any foreign particles which may be entrained in the airstream. The airstream then exits the filtration chamber 20 through the passageway 24 and passes to the second cooling stage, entering the cooling chamber 34. Therein, the airstream spirals downwardly through the extent of the helical cooling chamber 34. Due to the large thermal conductivity of the outer wall portion 28, heat is conducted away from the airstream outwardly therethrough and, to a lesser extent, inwardly through the inner wall portion 30, and this cooling of the airstream induces condensation and agglomeration of moisture contained within the airstream. The helical nature of the cooling chamber 34 provides the airstream with maximum exposure to the casing 17, while gradually directing the airstream downwardly, thus providing maximum heat transfer through the casing 17 and the inner wall portion 30 while directing the airstream into the next stage of purification. The airstream exits the cooling chamber 34 at the cooling chamber outlet 35, traveling radially inwardly through the holding reservoir 72, and then upwardly to the moisture removal chamber 38 which provides the third stage of purification.

Once in the moisture removal chamber 38, the airstream passes, in sequence, through the four moisture traps 42, 44, 46, 48 where agglomerated droplets of moisture that have formed as a result of the airstream's passage through the cooling chamber 34 are removed from the airstream. More specifically, the airstream is caused to flow radially outwardly from the central axis of the air dryer 15 through the first pair of moisture traps 42,44, following the predetermined flow path.

The first moisture trap 42 is made from a material designed to remove droplets of moisture having a size of 250 microns or greater, and such droplets are removed and allowed to collect in the collection chamber 40 as the airstream passes therethrough. The resistance to the flow of the airstream through the first moisture trap 42 results in a pressure drop thereacross, whereby the pressure of the airstream within the moisture removal chamber 38 is less than the pressure of the airstream passing through the holding reservoir 72 prior to its passage through the first moisture trap 42. A pressure differential is thereby established between the holding reservoir 72 and the removal chamber 38 so that whenever an airstream is passing through the air dryer 15, the pressure differential will cause check valves 71 to be positioned for closing the passageways 70.

After the airstream passes through the first moisture trap 42 it then passes through the second moisture trap 44, which is designed to remove droplets of a size 125 microns or greater, and such droplets are removed from the airstream and allowed to collect in the collection chamber 40 of the moisture removal chamber 38. In passing through the second moisture trap 44, a further pressure drop occurs and the airstream then flows upwardly through the passageway 56 and then radially inwardly through the second pair of moisture traps 46, 48. The third moisture trap 46 is designed to remove droplets of a size 60 microns or greater from the airstream, and the fourth and final moisture trap 48 is designed to remove droplets of a size 10 microns or greater. The airstream is then directed along the predetermined flow path to the moisture removal chamber outlet 50 which communicates with the airstream outlet channel 52, and the then pure and dry airstream is then directed outwardly through the air outlet channel 52 and the airstream outlet 16 where a pneumatic system conduit directs the airstream to the supply reservoir 13 (see FIG. 1).

The above-described passage of the airstream through the four moisture traps 42, 44, 46, 48 removes the agglomerated droplets of moisture, and these droplets then flow downward along and through the moisture traps for collection and containment in the collection chamber 40 at the bottom of the moisture removal chamber 38. As shown in FIG. 3, no outlet is provided for any moisture that collects in the space above support wall 49 and between moisture traps 46, 48 because virtually all of the moisture in the airstream is removed prior to the airstream reaching such spaces, but if desired or necessary the support member 49 could be provided with passageways and check valves corresponding to those in lower wall portion 66.

As stated above, moisture removed by the moisture traps 42, 44, 46, 48 is allowed to collect in the collection chamber 40 of the moisture removal chamber 38, and the check valves 71 provide for selective venting of this collected moisture. More specifically, when the airstream is flowing through the air dryer 15, the above-described pressure drop across the first pair of moisture traps 42,44, results in a pressure differential across the bottom wall portion 66 containing check valves 71 which keeps the check valves 71 lodged in the narrow portion of the passageways 70, thus closing the passageways 70 while moisture is being collected in the collection chamber 40. When the compressor 12 completes the operational portion of its duty cycle and ceases operation, the airstream is no longer flowing through the air dryer 15 and, as a consequence, pressure is equalized across the check valves 71, allowing them to drop away from their positions closing the passageways 70, thereby allowing the contents of the collection chamber 40 to vent through the divider screen 68 into the holding reservoir 72.

While the compressor 12 is in operation, the biasing spring 80 keeps the valve member 82 of the moisture evacuation valve 74 firmly in place, closing off the moisture evacuation channel 84 from the holding reservoir 72. The compressor is controlled by a governor, which is a part thereof. When the compressor 12 ends the operational portion of its duty cycle a burst of exhaust from the governor shuts down the compressor 12 and a portion of that burst is directed to the exhaust inlet 18 pressurizing the diaphragm chamber 77, thereby exerting pressure on the diaphragm 76 which forces the evacuation valve control rod 78 to move the valve seat 82 against the biasing spring 80, thereby lifting the valve seat 82 away from the evacuation valve support member 86, thus opening communication between the moisture evacuation channel 84 and the holding reservoir 72, which allows the contents of holding reservoir 72 to travel through the moisture evacuation channel 84 and the moisture evacuation outlet 88 into the atmosphere. As a consequence, the moisture collected during the operational portion of the compressor duty cycle is expelled from the air dryer when the compressor 12 enters the nonoperational portion of the compressor duty cycle.

As can be seen from the above, the purification apparatus of the present invention provides a compact, efficient method of removing moisture and other impurities from the airstream of a pneumatic system while utilizing compressor waste gas to operate a valve which purges the collected moisture from the air dryer 15 in conjunction with the compressor duty cycle. As a consequence, the supply reservoir receives substantially pure dry air with which to supply a pneumatic system, and the use of such air within the pneumatic system will greatly prolong the life of system components.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for purification of air within pneumatic systems such as truck air brake systems, having a compressor and a supply reservoir, said purification apparatus being positioned downstream of the compressor and upstream of the supply reservoir, for reducing the quantity of moisture and airborne particulate matter within the airstream of the pneumatic system, said purification apparatus comprising:
   (a) an air dryer including a casing having at least one air inlet, an air flow path therethrough, at least one air outlet, at least one drainage outlet, and having within said casing:
      (i) a first stage for filtration of incoming air, including a first stage filtration chamber located within said casing adjacent said air inlet and within said air flow path, said filtration chamber being in communication with said air inlet and containing filtration means for filtering out said particulate matter within the airstream entering said casing, and said filtration chamber having an outlet;
      (ii) a second stage for cooling the airstream, including an inlet receiving said airstream from said first stage outlet, chamber means for cooling said airstream to a sufficient degree to induce condensation and agglomeration of moisture contained in the airstream, and an outlet contained within said casing;
      (iii) a third stage for removing moisture from said airstream, including an inlet receiving said airstream from said second cooling stage outlet, a moisture reduction chamber within said casing, said moisture reduction chamber including moisture reduction means for acquiring moisture from the airstream passing therethrough, a collection chamber within said moisture reduction chamber for collecting said moisture acquired by said moisture reduction means, and channel means communicating with said casing air outlet to permit said airstream to be returned to said pneumatic system through said casing outlet; and
   (b) moisture evacuation means contained within said casing for evacuation of said collected moisture from said purification apparatus, whereby said purification apparatus can receive impurities and moisture from the pneumatic system when the compressor is operating thereby generating an airstream within said purification apparatus, and wherein said evacuation means expels collected moisture from said air dryer when the compressor ceases operation.

2. An apparatus for purification of air within pneumatic systems according to claim 1 wherein said first stage filtration means includes a metallic mesh filter located within said filtration chamber for removing particulate matter and moisture from said airstream.

3. An apparatus for purification of air within pneumatic systems according to claim 1 wherein said second stage of said casing includes a generally cylindrical exterior wall portion which is formed of a material having a large thermal conductivity, a generally cylindrical inner wall portion spaced away from and located concentrically with said exterior wall portion to form an annular chamber therebetween, and a helical guide wall extending between said inner wall portion and said exterior wall portion to form a helical flow path within said annular chamber through which said airstream flows helically through said cooling chamber in contact with said exterior wall portion and said interior wall portion, allowing said exterior wall portion and said interior wall portion to conduct heat away from said airstream, thereby cooling the airstream sufficiently to induce condensation and agglomeration of moisture within the airstream.

4. An apparatus for purification of air within pneumatic systems according to claim 1 wherein said moisture removal means includes a plurality of moisture traps arranged sequentially in said airstream flow path and causing a pressure drop in said airstream as it passes through each said moisture trap, each said moisture trap removing a quantity of moisture which has condensed and agglomerated in said second cooling stage, each said moisture trap being formed of a material more dense than the material of which the preceding moisture trap is formed, thereby allowing removal of increasingly minute droplets of moisture as the airstream passes sequentially through said plurality of moisture traps.

5. An apparatus for purification of air within pneumatic systems according to claim 4 wherein said moisture traps include a first pair and a second pair of concentric, annular tubes located in said air flow path within said moisture reduction chamber, said second pair of tubes being coaxial and cylindrically coplanar with said first pair of tubes, said first and second pairs of tubes being separated by a tube support member, and wherein said airstream flows radially outwardly through said first pair of tubes and radially inwardly through said second pair of tubes, and then outwardly through said airstream outlet.

6. An apparatus for purification of air within pneumatic systems according to claim 5 wherein said concentric annular tubes are formed of a porous molded polyethylene structure of variable bulk density, the innermost tube in said first pair retaining particles of approximately 250 microns, the outermost tube in said first pair retaining particles of approximately 125 microns, the outermost tube in said second pair retaining particles of approximately 60 microns and the innermost tube in said second pair retaining particles of approximately 10 microns.

7. An apparatus for purification of air within pneumatic systems according to claim 4 wherein said moisture evacuation means includes check valve means for selectively venting the contents of said collection chamber into said moisture evacuation means.

8. An apparatus for purification of air within pneumatic systems according to claim 7 wherein said collection chamber includes a bottom wall portion, and said moisture evacuation means includes a holding reservoir located beneath said bottom wall portion, said collection chamber being on the downstream side of at least one of said moisture traps and said holding reservoir being on the upstream side of said one moisture trap, and said bottom wall portion having at least one passageway formed therein, said check valve means being located in said passageway and being held in a closed position by said pressure drop across said moisture trap.

9. An apparatus for purification of air within pneumatic systems according to claim 8 wherein said moisture evacuation means includes selectively operable moisture evacuation valve means for venting said holding reservoir to the atmosphere, thereby expelling said collected moisture from said purification apparatus.

10. An apparatus for purification of air within pneumatic systems according to claim 1 and further comprising a precooler for use in areas of elevated humidity, said precooler being located upstream of said air dryer, said precooler including a frame and a helical coil supported by said frame, said helical coil being formed of a material having a large thermal conductivity and having a plurality of turns disposed in a spaced side-by-side relationship creating space between each turn whereby atmospheric air can flow through said spaces and remove heat from said coil and from said airstream within said coil, for inducement of condensation and agglomeration of moisture within the airstream prior to the airstream entering said air dryer.

11. An apparatus for purification of air within pneumatic systems according to claim 1 and further comprising a water trap located upstream of said air dryer, for use in areas of elevated humidity, and including heat source means, said water trap including a perforated container having desiccant means for removal of moisture from the airstream, said water trap being mounted closely adjacent said heat source thereby allowing heated air to pass through said perforations to warm said desiccant means, evaporating moisture trapped therein, and renewing said desiccant means.

12. An apparatus for purification of air within pneumatic systems such as truck air brake systems, having a compressor and a supply reservoir, said purification apparatus being positioned downstream of the compressor and upstream of the supply reservoir for reducing the quantity of moisture and airborne particulate matter within the airstream of the pneumatic system, said purification apparatus comprising:
(a) an air dryer including a casing having at least one air inlet, and airflow path therethrough, at least one air outlet, at least one drainage outlet, and having within said casing:
(i) a first stage for filtration of incoming air including a first stage filtration chamber located within said casing adjacent said air inlet within said flow path, said filtration chamber being in communication with said air inlet and containing a metallic mesh filter for filtering out solid particulate matter within the airstream entering said casing and said filtration chamber having an outlet;
(ii) a second stage for cooling the airstream including an inlet for receiving said airstream from said first stage outlet, and chamber means for cooling said airstream to a sufficient degree to induce condensation and agglomeration of moisture contained in the airstream, said casing including a generally cylindrical exterior wall portion which is formed of a material having a large thermal conductivity, a generally cylindrical inner wall portion spaced away from and located concentrically with said exterior wall portion to form an annular chamber therebetween, and a helical guide wall extending between said inner wall portion and said exterior wall portion to form a helical flow path within said annular chamber through which said airstream flows helically through said cooling chamber in contact with said exterior wall portion and said interior wall portion allowing said exterior wall portion and said interior wall portion to conduct heat away from said airstream, thereby cooling the airstream sufficiently to insure condensation and agglomeration of moisture within the airstream;
(iii) a third stage for removing moisture from said airstream, including an inlet receiving said airstream from second stage outlet, a moisture reduction chamber within said casing, said moisture reduction chamber including moisture reduction means for acquiring moisture from the airstream passing therethrough, said moisture reduction means including a plurality of moisture traps arranged sequentially in said airstream and causing a pressure drop in said airstream as it passes through each said moisture trap, each said moisture trap removing a quantity of moisture which has condensed and agglomerated in said second cooling stage, each said moisture trap being formed of a material more dense than the material of which the preceding moisture trap is formed, thereby allowing removal of increasingly minute droplets of moisture as the airstream passes sequentially through said plurality of moisture traps; said moisture traps including a first pair and a second pair of concentric, annular tubes located in said air flow path within said moisture reduction chamber, said tubes being formed of a porous molded polyethylene structure of variable bulk density, said second pair of tubes being coaxial and cylindrically coplanar first pair of tubes, said first and second pairs of tubes being separated by a tube support member, wherein said airstream flows radially outwardly through said first pair of tubes and radially inwardly through said second pair of tubes, then outwardly through said air outlet; a collection chamber within said moisture reduction chamber for collecting said moisture acquired by said moisture reduction means, and channel means communicating with said casing air outlet to permit said airstream to be returned to said pneumatic system through said casing outlet;

(b) moisture evacuation means contained within said casing for evacuation of said collected moisture from said purification apparatus whereby said purification apparatus can receive impurities and moisture from the pneumatic system when the compressor is operating thereby generating an airstream within said purification apparatus, and wherein said evacuation means expels collected moisture from said air dryer when the compressor ceases operation.

13. An apparatus for purification of air within pneumatic systems according to claim 12 wherein said moisture evacuation means includes check valve means for selectively venting the contents of said collection chamber into said moisture evacuation means.

14. An apparatus for purification of air within pneumatic systems according to claim 12 wherein said collection chamber includes a bottom wall portion, and said moisture evacuation means includes a holding reservoir located beneath said bottom wall portion, said collection chamber being on the downstream side of at least one of said moisture traps and said holding reservoir being on the upstream side of said one moisture trap, and said bottom wall portion having at least one passageway formed therein, said check valve means being located in said passageway and being held in a closed position by said pressure drop across said moisture trap.

15. An apparatus for purification of air within pneumatic systems according to claim 12 wherein said moisture evacuation means includes selectively operable moisture evacuation valve means for venting said holding reservoir to the atmosphere, thereby expelling said collected moisture from said purification apparatus.

16. An apparatus for purification of air within pneumatic systems according to claim 12 and further comprising a precooler for use in areas of elevated humidity, said precooler being located upstream of said air dryer, said precooler including a frame and a helical coil supported by said frame, said helical coil being formed of a material having a large thermal conductivity and having a plurality of turns disposed in a spaced side-by-side relationship creating space between each turn whereby atmospheric air can flow through said spaces and remove heat from said coil and from said airstream within said coil, for inducement of condensation and agglomeration of moisture within the airstream prior to the airstream entering said air dryer.

17. An apparatus for purification of air within pneumatic systems according to claim 12 and further comprising a water trap located upstream of said air dryer, for use in areas of elevated humidity, and including heat source means, said water trap including a perforated container having desiccant means for removal of moisture from the airstream, said water trap being mounted closely adjacent said heat source thereby allowing heated air to pass through said perforations to warm said desiccant means, evaporating moisture trapped therein, and renewing said desiccant means.

* * * * *

UNITED STATES PATENT AND TRADEMARK OFFICE
CERTIFICATE OF CORRECTION

PATENT NO. : 5,190,569

DATED : March 2, 1993

INVENTOR(S) : Wayne D. McGrath

It is certified that error appears in the above-identified patent and that said Letters Patent is hereby corrected as shown below:

Column 4, line 39, after "end" insert -- cap 90 of the casing 17 and communicates with the exhaust outlet --.

Signed and Sealed this

Thirtieth Day of November, 1993

Attest:

BRUCE LEHMAN

Attesting Officer

Commissioner of Patents and Trademarks